US007995266B2

(12) United States Patent
Homma et al.

(10) Patent No.: US 7,995,266 B2
(45) Date of Patent: Aug. 9, 2011

(54) PARTICLES FOR DISPLAY MEDIA AND INFORMATION DISPLAY PANEL (75) Inventors: Masahiro Homma, Kiyose (JP); Norihiko Kaga, Kodaira (JP); Kazuya Murata, Hino (JP)

(73) Assignee: Bridgestone Corporation, Tokyo (JP)

( * ) Notice: Subject to any disclaimer, the term of this patent is extended or adjusted under 35 U.S.C. 154(b) by 133 days.

(21) Appl. No.: 12/526,421

(22) PCT Filed: Feb. 8, 2008

(86) PCT No.: PCT/JP2008/052183
§ 371 (c)(1),
(2), (4) Date: Sep. 22, 2009

(87) PCT Pub. No.: WO2008/096867
PCT Pub. Date: Aug. 14, 2008

(65) Prior Publication Data
US 2010/0110530 A1 May 6, 2010

(30) Foreign Application Priority Data

Feb. 9, 2007 (JP) ................................. 2007-030922
Feb. 9, 2007 (JP) ................................. 2007-031118

(51) Int. Cl.
*G02B 26/00* (2006.01)
*B05D 5/12* (2006.01)
(52) U.S. Cl. .......... 359/296; 427/58; 427/203; 427/458; 427/466; 204/450; 204/600
(58) Field of Classification Search .............. 427/58, 427/203, 458, 466; 204/450, 600; 359/296
See application file for complete search history.

(56) References Cited

U.S. PATENT DOCUMENTS

| 6,741,387 | B2 * | 5/2004 | Shigehiro et al. | 359/296 |
| 6,809,854 | B2 * | 10/2004 | Yamamoto et al. | 359/296 |
| 6,822,782 | B2 | 11/2004 | Honeyman et al. | |
| 7,023,608 | B2 * | 4/2006 | Hiraoka et al. | 359/296 |
| 7,247,379 | B2 * | 7/2007 | Pullen et al. | 428/407 |
| 7,295,364 | B2 * | 11/2007 | Yamamoto | 359/296 |
| 7,352,502 | B2 * | 4/2008 | Miyazaki et al. | 359/296 |
| 7,652,656 | B2 * | 1/2010 | Chopra et al. | 359/296 |
| 7,675,502 | B2 * | 3/2010 | Chopra et al. | 345/107 |
| 7,772,339 | B2 * | 8/2010 | Minami | 526/204 |
| 7,848,007 | B2 * | 12/2010 | Paolini et al. | 359/296 |
| 7,864,406 | B2 * | 1/2011 | Soyama et al. | 359/296 |

FOREIGN PATENT DOCUMENTS

| JP | 2003-315846 A | 11/2003 |
| JP | 2004-526210 A | 8/2004 |
| JP | 2006-301217 A | 11/2006 |

* cited by examiner

*Primary Examiner* — Evelyn A. Lester
(74) *Attorney, Agent, or Firm* — Sughrue Mion, PLLC

(57) ABSTRACT

Particles for display media are constructed as spherical resin fine particles, in which functional groups indicating positively-charging properties are existent on their surfaces, which are obtained by polymerizing monomer by utilizing initiator having functional groups indicating positively-charging properties produced by reacting organic alkyl sulfonates and both terminal ends of azo initiator having cationic functional group including nitrogen-containing heterocycle or nitrogen-containing fatty series, or, are constructed as spherical resin fine particles, in which functional group indicating charging properties or ionic properties are existent on their surfaces, which are obtained by polymerizing monomer by utilizing initiator having functional groups indicating charging properties or ionic properties at its both terminal ends.

14 Claims, 6 Drawing Sheets

PARTICLES FOR DISPLAY MEDIA AND INFORMATION DISPLAY PANEL

TECHNICAL FIELD

The present invention relates to particles for display media, especially relates to particles for display media used for improving durability and positively-charging properties of the particles constituting the display media of an information display panel, in which at least one group of display media constituted by at least one group of particles are sealed in a space between two substrates, at least one substrate being transparent, and, in which the display media, to which an electrostatic field is applied, are made to move so as to display information such as an image, and an information display panel using the particles for display media.

RELATED ART

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable, as compared with LCD, as inexpensive visual display device of the next generation from a merit having wide field of vision close to normal printed matter, having smaller consumption, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [Chou Kokurai and three others, "New toner display device (1)", The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display panel is known, in which the display media having optical reflectance and charge characteristics are sealed between two substrates, at least one substrate being transparent, and, in which the display media, to which an electrostatic field is applied, are made to move so as to display information such as an image.

Problems of a First Aspect of the Invention

The particles for display media used for the information display panel need durability because, in the information display panel, the particles come into collision with the other particles or the information display panel repeatedly. Since the resin fine particles covering the surface of the particles for display media need strength, it is desirable to have a high crosslink density. Therefore, it is necessary monomer having at least two vinyl groups such as divinylbenzen.

As a method of producing particles having a particle diameter of not larger than 1000 nm, an emulsion polymerization method is used. In this method, monomer is dispersed in a water solution by utilizing a surface active agent and is polymerized. In this case, if use is made of a polymer surface active agent such as polyvinyl alcohol, surfactant composite fine particles are produced, and charging properties of the surfactant composite fine particles are bad. Therefore, this method is not used for the information display panel.

As a method of producing fine particles, in which no surface active agent is used, a soap-free polymerization method is used. In the soap-free polymerization method, a polymerization is started by using a water-soluble initiator, becomes insoluble with water in oligomer state, agglutinated, forms micelle, and further proceeds to produce the fine particles. In this case, since a hydrophilic portion is faced to a water solution side, a hydrophilic group functions as a charging group. In order to make a functional group portion in a water-soluble state, it is desirable that the functional group becomes salt.

However, in the case such that use is made of azo initiators of commercially available hydrochloride type such as 2,2'-azobis (2-methylpropionamidine) dihydrochloride, and 2,2'-azobis [2-(imidazoline-2-yl) propane] dihydrochloride, it is difficult to produce particles under a condition such that a weight ratio between styrene and divinylbenzen is 1:1, and then fusion body and giant fixed body are generated. Therefore, it is not possible to obtain spherical resin fine particles having a particle diameter of not greater than 1000 nm.

Further, as the particles for display media used for the information display panel, it is necessary to use both of the particles having positive polarity and the particles having negative polarity, and thus it is necessary to use the resin fine particles having functional group with charging function on their surface so as to improve charging properties.

However, the spherical resin fine particles having functional group with charging function on their surfaces are not realized.

Problems of a Second Aspect of the Invention

As the particles for display media constituting the display media used for the information display panel mentioned above, it is necessary to have a flowability and a controllability of charging amount. As electrophotographic toners, which are different from an object of the present invention, there is known a technique for improving the flowability and for controlling the charging amount by arranging particles (outer additives such as titanium oxide, silica fine particles) on the toner parent particles. However, if the electrophotographic toners with the outer additives mentioned above are used as the particles for display media constituting the display media used for the information display media mentioned above, an aggregation of the child particles (outer additives) is easily broken and phenomena such as deterioration of flowability and variation of charging properties occur by a mechanical stress applied due to a colli§ion between the particles and the other particles or a collision between the particles and the electrode plate during a reversal endurance test in which the display is repeatedly performed reversibly. Moreover, there occurs a phenomenon such that the child particles are completely embedded in the parent particles. Therefore, there is a drawback such that initial performance is not maintained during the reversal endurance test. Further as the particles (particles for display media) constituting the display media used for the information display panel mentioned above, there is a trial for using composite particles in which the fine child particles having charging properties are further arranged or fixed on a surface of color particles having charging properties such as electrophotographic toner particles, or, for using composite particles in which the fine child particles having charging properties are arranged or fixed to a surface of the color particles so as to generate the charring properties. However, in this case, if use is made of the fine child particles having small absolute value |Q| of the equilibrium weight average charge amount to excess, there occurs a drawback, such that the charging amount of the particles for display media becomes insufficient and a driving performance in the panel becomes deteriorated (necessary driving voltage becomes high), or, there occurs a drawback such that an equilibrium charging amount q/m is decreased below a necessary level in a short time period and a durable display stability becomes bad.

DISCLOSURE OF THE INVENTION

Disclosure of a First Aspect of the Invention

An object of the first aspect of the invention is to provide particles for display media having high durability and improved positive charging properties and to provide an information display panel using the display media constituted by the particles for display media mentioned above, which has excellent display stability.

In order to achieve the object mentioned above, according to the first aspect of the invention, the particles for display media are characterized in that the particles are constructed as spherical resin fine particles, in which functional groups indicating positively-charging properties are existent on their surfaces, which are obtained by polymerizing monomer by utilizing initiator having functional groups indicating positively-charging properties produced by reacting organic alkyl sulfonates and both terminal ends of azo initiator having cationic functional group including nitrogen-containing heterocycle or nitrogen-containing fatty series.

As the preferred embodiments of the particles for display media according to the first aspect of the invention, there are cases: such that an equilibrium weight average charge amount Q of the spherical resin fine particles is in a range of the following formula:

Q>1.0 [μC/g]; such that a particle diameter is 30-1000 nm; such that use is made of 0.5-80 mol % of the initiator with respect to a monomer amount; such that the particle includes 1 mol % or more of monomer having at least two vinyl groups; and such that the particles are used for surface adhesion composed process.

According to the first aspect of the invention, an information display panel is characterized in that use is made of the particles for display media mentioned above as particles constituting the display media of an information display panel, in which at least one group of display media having optical reflectance and charge properties and constituted by at least one group of particles are sealed in a space between two substrates, at least one substrate being transparent, and, in which the display media, to which an electrostatic field is applied, are made to move so as to display information such as an image.

In the particles for display media according to the first aspect of the invention, the particles for display media are constructed as spherical resin fine particles, in which functional groups indicating positively-charging properties are existent on their surfaces, which are obtained by polymerizing monomer by utilizing initiator having functional groups indicating positively-charging properties produced by reacting organic alkyl sulfonates and both terminal ends of azo initiator having cationic functional group including nitrogen-containing heterocycle or nitrogen-containing fatty series. Therefore, the particles for display media becomes the particles for display media having high durability and improved positive charging properties, and the information display panel using the display media constituted by the particles for display media mentioned above obtain excellent display stability.

Disclosure of a Second Aspect of the Invention

An object of the second aspect of the invention is to provide particles for display media having high durability and improved charging properties and to provide an information display panel using the display media constituted by the particles for display media mentioned above, which has excellent display stability.

In order to achieve the object mentioned above, according to the second aspect of the invention, the particles for display media are characterized in that the particles are constructed as spherical resin fine particles, in which functional group indicating charging properties or ionic properties is existent on their surfaces, which are obtained by polymerizing monomer by utilizing initiator having functional groups indicating charging properties or ionic properties at its both terminal ends.

As the preferred embodiments of the particles for display media according to the second aspect of the invention, there are cases: such that an equilibrium weight average charge amount Q of the spherical resin fine particles is in a range of the following formula:

Q>1.0[μC/g]; such that a particle diameter is 30-1000 nm; such that use is made of 0.5-80 mol % of the initiator with respect to a monomer amount; such that the particle includes 1 mol % or more of monomer having at least two vinyl groups; and such that the particles are used for surface adhesion composed process.

According to the second aspect of the invention, an information display panel is characterized in that use is made of the particles for display media mentioned above as particles constituting the display media of an information display panel, in which at least one group of display media having optical reflectance and charge properties and constituted by at least one group of particles are sealed in a space between two substrates, at least one substrate being transparent, and, in which the display media, to which an electrostatic field is applied, are made to move so as to display information such as an image.

In the particles for display media according to the second aspect of the invention, the particles for display media are constructed as spherical resin fine particles, in which functional group indicating charging properties or ionic properties are existent on their surfaces, which are obtained by polymerizing monomer by utilizing initiator having functional groups indicating charging properties or ionic properties at its both terminal ends. Therefore, the particles for display media becomes the particles for display media having high durability and improved charging properties, and the information display panel using the display media constituted by the particles for display media mentioned above obtain excellent display stability.

BEST MODE FOR CARRYING OUT THE INVENTION

Hereinafter, the best mode for carrying out the present invention will be explained in detail with reference to the drawings.

At first, a basic construction of an information display panel using display media constituted by the particles for display media according to the present invention will be explained. In the information display panel used in the present invention, an electrostatic field is applied to display media sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

Examples of the information display panel that is an object of the invention will be explained with reference to FIGS. 1a, 1b-FIGS. 4a, 4b and FIGS. 5a-5d.

In the examples shown in FIGS. 1a and 1b, at least two or more groups of display media 3 having different optical reflectance and charge characteristic and consisting of at least one or more groups of particles (here, white color display media 3W made of the particles constituted by particles 3Wa for white color display media and black color display media 3B made of the particles constituted by particles 3Ba for black color display media are shown) are moved in a perpendicular direction with respect to substrates 1 and 2, in accordance with an electric field generated by applying a voltage between an electrode 5 (individual electrode) arranged to the substrate 1 and an electrode 6 (individual electrode) arranged to the substrate 2. Then, as shown in FIG. 1a, a white color display is performed by viewing the white color display media 3W to the observer, or, as shown in FIG. 1b, a black color display is performed by viewing the black color display media 3B to an observer. Moreover, in FIGS. 1a and 1b, the partition walls arranged at the near side are omitted.

In the examples shown in FIGS. 2a and 2b, at least two or more groups of display media 3 having different optical reflectance and charge characteristic and consisting of at least one or more groups of particles (here, white color display media 3W made of the particles constituted by particles 3Wa for white color display media and black color display media 3B made of the particles constituted by particles 3Ba for black color display media are shown) are moved in a perpendicular direction with respect to substrates 1 and 2, in accordance with an electric field generated by applying a voltage between an electrode 5 (line electrode) arranged to the substrate 1 and an electrode 6 (line electrode) arranged to the substrate 2. Then, as shown in FIG. 2a, a white color display is performed by viewing the white color display media 3W to the observer, or, as shown in FIG. 2b, a black color display is performed by viewing the black color display media 3B to an observer. Moreover, in FIGS. 2a and 2b, the partition walls arranged at the near side are omitted.

In the examples shown in FIGS. 3a and 3b, at least one group of display media 3 having different optical reflectance and charge characteristic and consisting of at least one or more groups of particles (here, white color display media 3W made of the particles constituted by particles 3Wa for white color display media) are moved in a parallel direction with respect to substrates 1 and 2, in accordance with an electric field generated by applying a voltage between the electrode 5 and the electrode 6 arranged to the substrate 1. Then, as shown in FIG. 3a, a white color display is performed by viewing the white color display media 3W to the observer, or, as shown in FIG. 3b, a black color display is performed by viewing the black color plate 7 to an observer. Moreover, in FIGS. 3a and 3b, the partition walls arranged at the near side are omitted.

In the examples shown in FIGS. 4a and 4b, a color display utilizing a unit pixel constituted by three cells is explained. In the examples shown in FIGS. 4a and 4b: the white color display media 3W and the black color display media 3B are filled in all cells 21-1 to 21-3 as the display media; a red color filter 22R is arranged to the first cell 21-1 at the observer's side; a green filter 22G is arranged to the second cell 21-2 at the observer's side; and a blue color filter 22B is arranged to the third cell 21-3 at the observer's side, so that the unit pixel is constructed by the first cell 21-1, the second cell 21-2 and the third cell 21-3. In this embodiment, as shown in FIG. 4a, a white color display is performed for the observer by arranging the white color display media 3W to all the first cell 21-1 to the third cell 21-3 at the observer's side, or, as shown in FIG. 4b, a black color display is performed for the observer by arranging the black color display media 3B to all the first cell 21-1 to the third cell 21-3 at the observer's side. Moreover, in FIGS. 4a and 4b, the partition walls arranged at the near side are omitted. The electrodes may be arranged to the outside of the substrate or may be arranged to the inside of the substrate or may be embedded in the substrate. A multicolor display can be performed by varying a movement off display media in respective cells.

Figure 1:
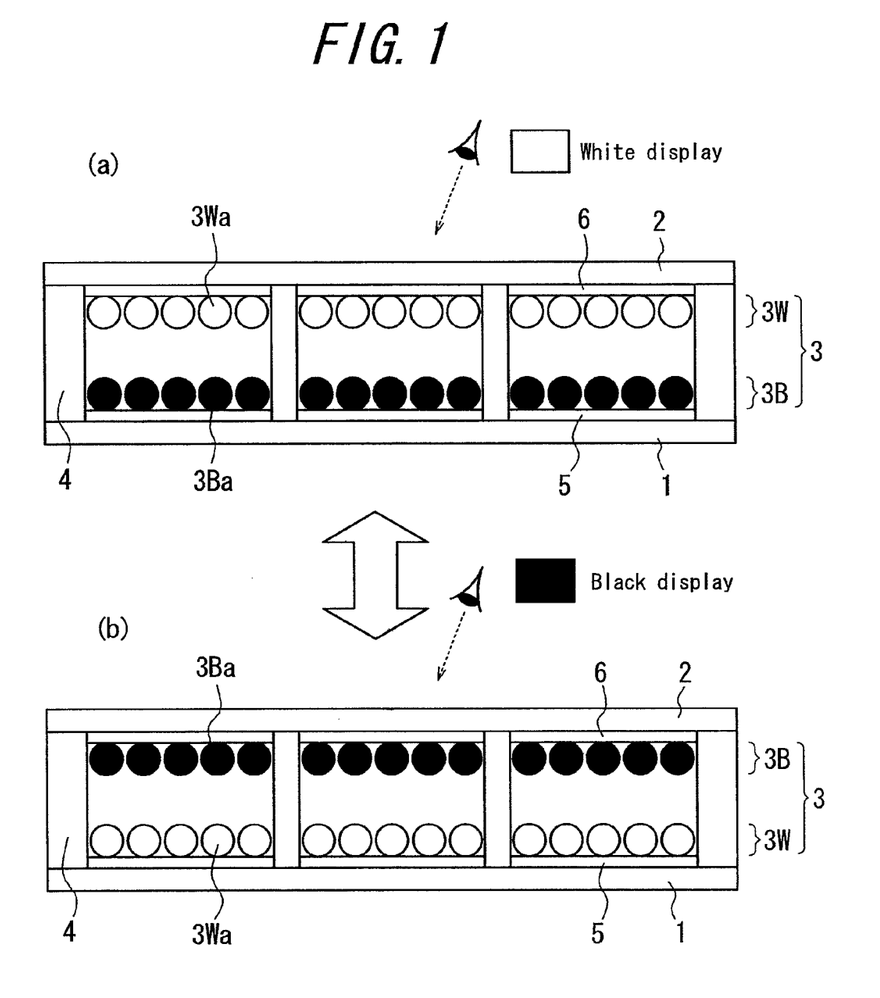
FIGS. 1a and 1b are schematic views respectively showing one principle construction of the information display panel according to the invention.
Figure 2:
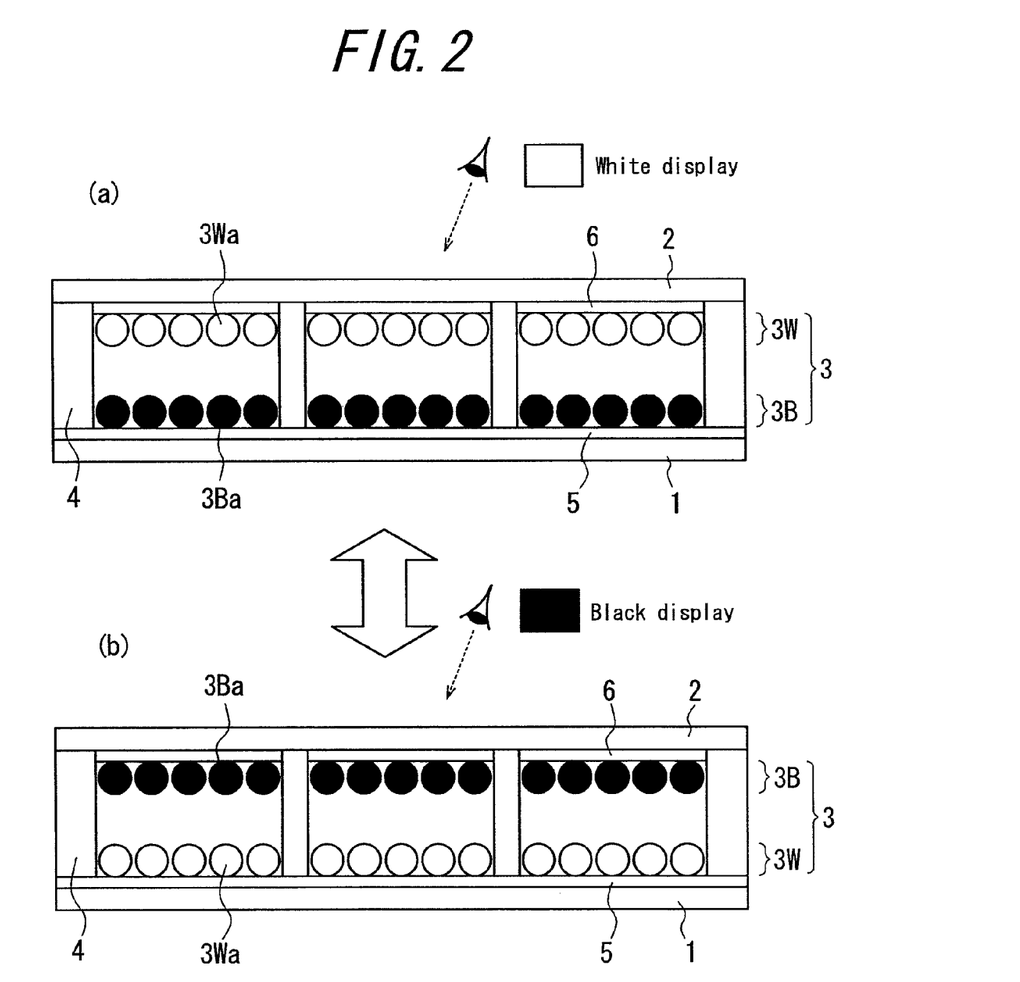
FIGS. 2a and 2b are schematic views respectively illustrating another principle construction of the information display panel according to the invention.
Figure 3:
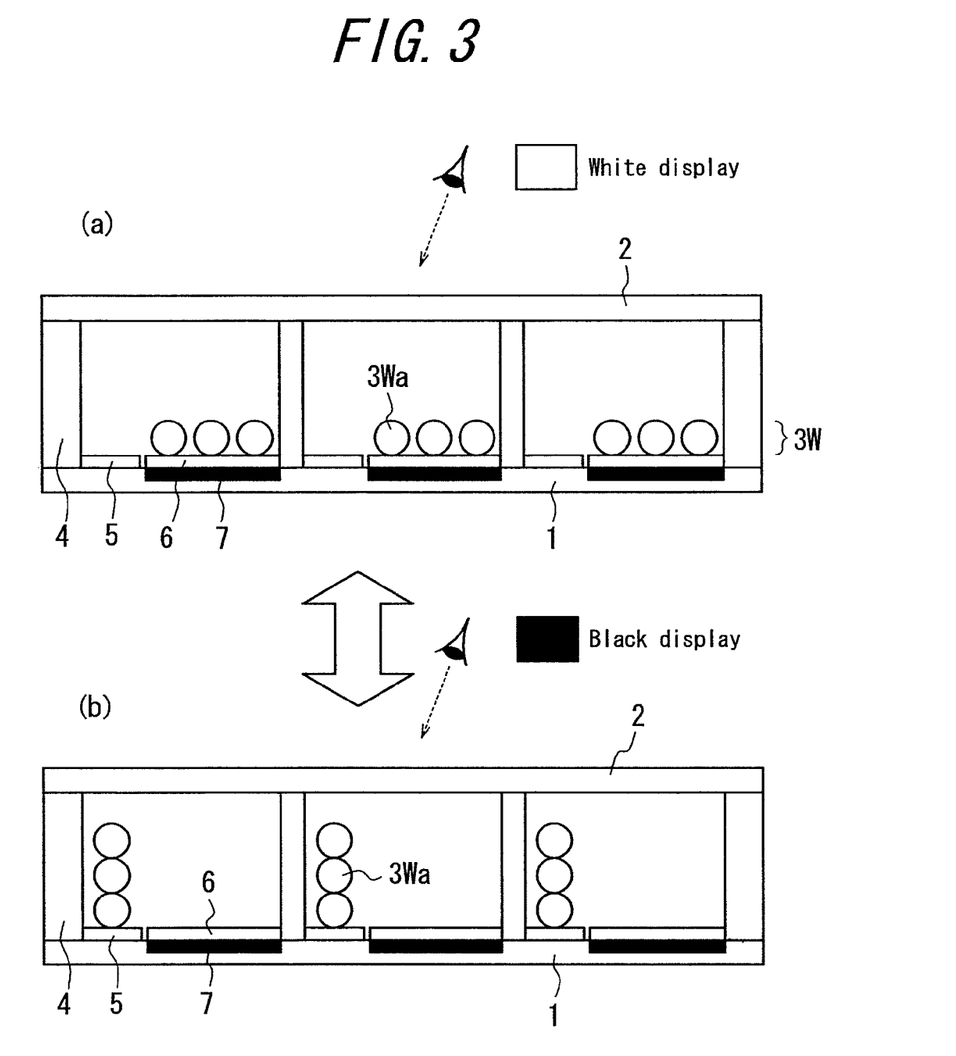
FIGS. 3a and 3b are schematic views respectively depicting still another principle construction of the information display panel according to the invention.
Figure 4:
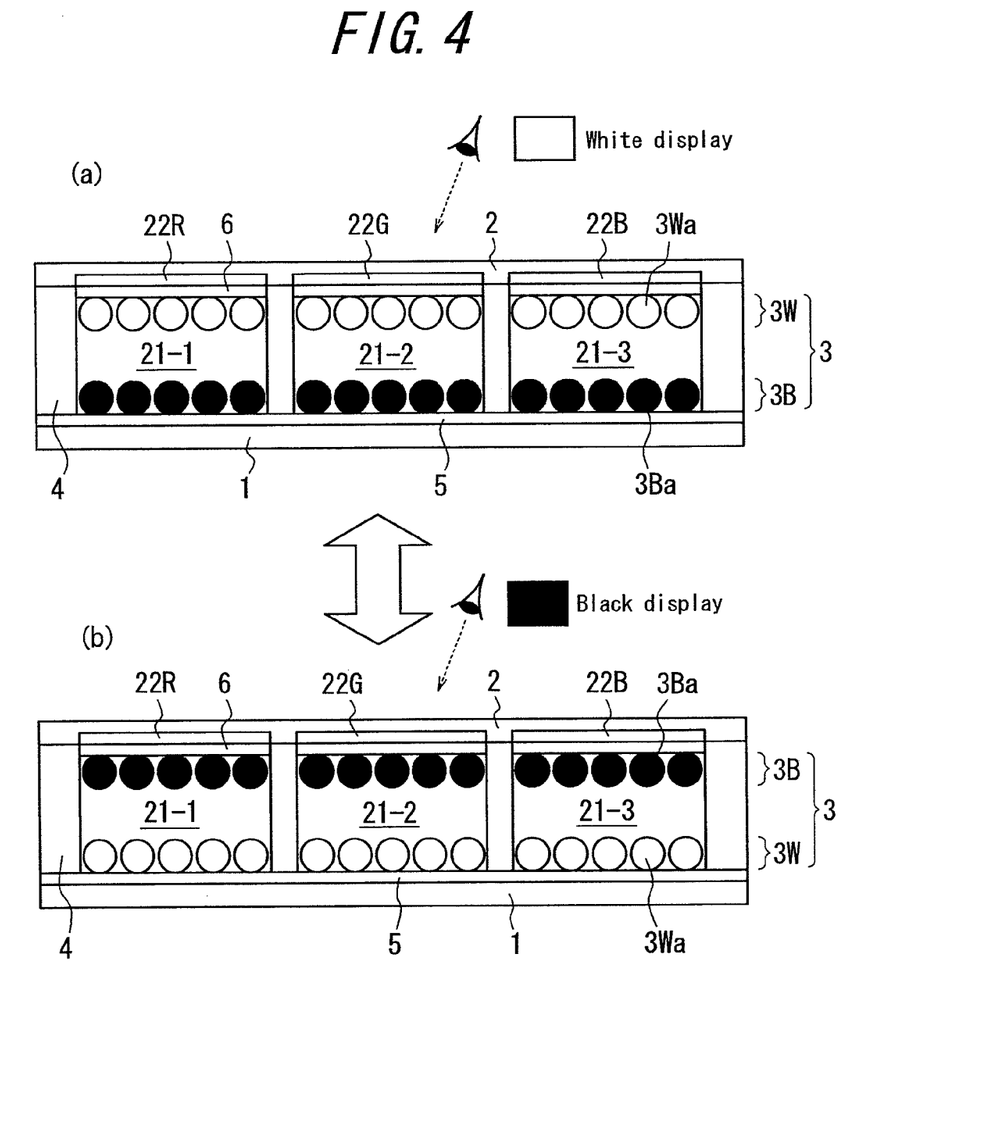
FIGS. 4a and 4b are schematic views respectively showing still another principle construction of the information display panel according to the invention.
Figure 5:
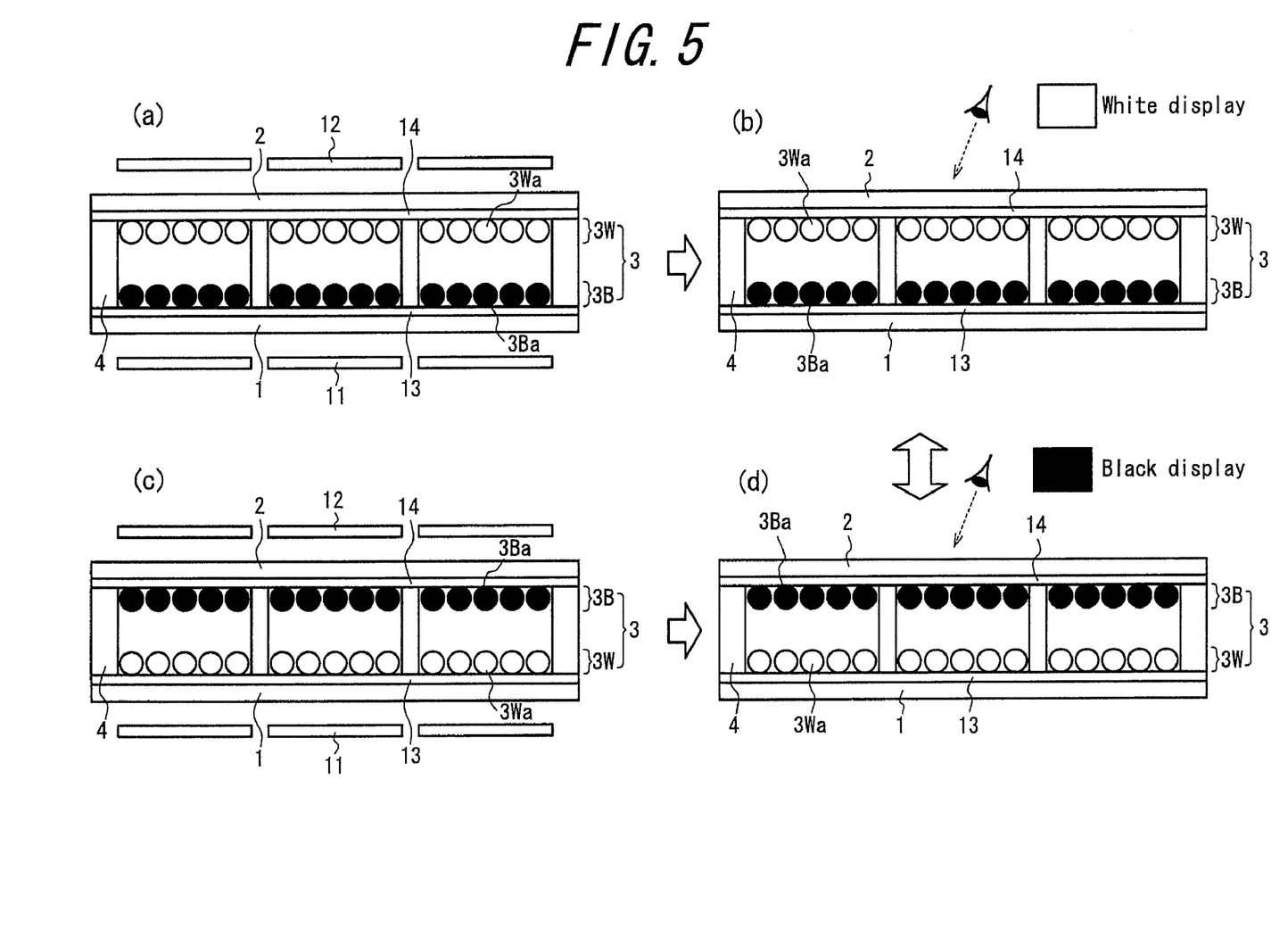
FIGS. 5a-5d are schematic views respectively illustrating still another principle construction of the information display panel according to the invention.

In the examples shown in FIGS. 5a-5d, firstly as shown in FIGS. 5a and 5c, at least two or more groups of display media 3 having different optical reflectance and charge characteristic and consisting of at least one or more groups of particles (here, white color display media 3W made of the particles constituted by particles 3Wa for white color display media and black color display media 3B made of the particles constituted by particles 3Ba for black color display media are shown) are moved in respective cells formed by the partition walls 4 in a perpendicular direction with respect to substrates 1 and 2, in accordance with an electric field generated by applying a voltage between an outside electric field generating means 11 arranged outside of the substrate 1 and an outside electric field generating means 12 arranged outside of the substrate 2. Then, as shown in FIG. 5b, a white color display is performed by viewing the white color display media 3W to the observer, or, as shown in FIG. 5d, a black color display is performed by viewing the black color display media 3B to an observer. Moreover, in FIGS. 5a-5b, the partition walls arranged at the near side are omitted. Further, a conductive member 13 is arranged inside of the substrate 1, and a conductive member 14 is arranged inside of the substrate 2. These conductive members may be omitted.

Hereinafter, the particles for display media according to the first aspect of the invention and the second aspect of the invention will be explained. The particles for display media according to the invention are the particles for display media used for a surface adhesion composed process, and are used for the particles for display media constituting the display media of the information display panel shown in FIGS. 1a, 1b-FIGS. 4a, 4b and FIGS. 5a-5d. Moreover, the display media having optical reflectance and charge properties mentioned above are sealed in a space between two substrates, at least one substrate being transparent, of the information display panel mentioned above.

Explanations of the Particles for Display Media According to the First Aspect of the Invention The particles for display media are constructed as spherical resin fine particles, in which functional groups indicating positively-charging properties are existent on their surfaces, which are obtained by polymerizing monomer by utilizing initiator having functional groups indicating positively-charging properties produced by reacting organic alkyl sulfonates and both terminal ends of azo initiator having cationic functional group including nitrogen-containing heterocycle or nitrogen-containing fatty series.

The preferred embodiments of the particles for display media according to the invention are as follows.
(1) An equilibrium weight average charge amount Q of the spherical resin fine particles is in a range of the following formula:

$Q>1.0[\mu C/g]$.

(2) A particle diameter is 30-1000 nm.
(3) Use is made of 0.5-80 mol % of the initiator with respect to a monomer amount.
(4) The particle includes 1 mol % or more of monomer having at least two vinyl groups. Preferably, the particle includes 10 mol % or more of monomer having at least two vinyl groups.

The structure of the particles for display media according to the invention mentioned above provides the structure of the child particles for achieving high durability and improved positively-charging properties. Specifically, the particles for display media according to the invention are the spherical resin particles (spherical child particles), in which functional groups indicating positively-charging properties are existent on their surface portions. In the case such that the spherical resin fine particles having functional groups indicating positively-charging properties are to be produced, the spherical resin fine particle having a particle diameter of not greater than 1000 nm can be obtained by performing polymerization such as emulsion polymerization by utilizing initiator having functional groups indicating positively-charging properties produced by reacting organic alkyl sulfonates and both terminal ends of azo initiator having cationic functional group including nitrogen-containing heterocycle or nitrogen-containing fatty series. Moreover, in the case such that high durability and improved positively-charging properties are to be achieved, the particles for display media according to the invention can be obtained by using 1 mol % or more of monomer having at least two vinyl groups.

In the present invention, a synthesizing of a new initiator having positively-charging properties including no inorganic acid such as hydrochloric acid, sulfuric acid and so on became successful. It is possible to produce the particles for display media constituted as the spherical fine particles having a particle diameter of not greater than 1000 nm by performing a polymerization by utilizing the initiators mentioned above.

Structure of the Initiator

The initiators used for producing the particles for display media according to the invention are the initiators having functional group indicating positively-charging properties, which are produced by reacting organic alkyl sulfonates such as methyl trifluorosulfonate, p-toluenesulfonate and azo initiator having cationic functional group at their both terminal ends, including nitrogen-containing heterocycle such as imidazole, pyridine and so on or nitrogen-containing fatty series such as alkylamine, dialkylamine, cyclohexylamine and so on.

Specific Examples of the Initiators

As the initiators having positively-charging properties, use is made of 2,2'-azobis [2-(2-methylimidazoline-2-yl) propane] trifluoromethylsulfonate, 2,2'-azobis [2-(2-ethylimidazoline-2-yl) propane] trifluoromethylsulfonate, 2,2'-azobis [2-(2-benzilimidazoline-2-yl) propane] trifluoromethylsulfonate, 2,2'-azobis [2-(2-methylimidazoline-2-yl) propane] trifluoromethylbenzenesulfonate, 2,2'-azobis [2-(2-methylimidazoline-2-yl) propane] toluenesulfonate, 2,2'-azobis [2-(2-methylimidazoline-2-yl) propane] benzenesulfonate, 2,2'-azobis [2-(2-ethylimidazoline-2-yl) propane] trifluoromethylbenzenesulfonate, 2,2'-azobis [2-(2-ethylimidazoline-2-yl) propane] toluenesulfonate, 2,2'-azobis [2-(2-ethylimidazoline-2-yl) propane] benzenesulfonate, 2,2'-azobis [2-(2-butylimidazoline-2-yl) propane] trifluoromethylbenzenesulfonate, 2,2'-azobis [2-(2-butylimidazoline-2-yl) propane] toluenesulfonate, 2,2'-azobis [2-(2-butylimidazoline-2-yl) propane] benzenesulfonate, 2,2'-azobis [2-(2-benzilimidazoline-2-yl) propane] trifluoromethylbenzenesulfonate, 2,2'-azobis [2-(2-benzilimidazoline-2-yl) propane] toluenesulfonate, 2,2'-azobis [2-(2-benzilimidazoline-2-yl) propane] benzenesulfonate, and so on.

In order to form the particles having positively-charging properties, it is preferred to use 0.5-80% of the initiator mentioned above with respect to the monomer amount.

Initiator Synthesizing Scheme and Initiator Synthesizing Examples

One initiator synthesizing method having positively-charging properties is as follows. An initiator having organic sulfonate such as 2,2'-azobis [2-(torifluorosulfonate-2-methylimidazoline-2-yl) propane can be synthesized by: dissolving azo initiator such as 2,2'-azobis [2-(imidazoline-2-yl) propane] in an organic solvent such as methanol; adding organic alkyl sulfonates such as methyl trifluoromethylsulfonate; reacting at room temperature for 18 hours or more; removing the solvent by means of evaporator; washing two times by means of chloroform; performing a drying process under reduced pressure; and removing the solvent.

Examples of Raw Materials

As the initiator used for the particles having positively-charging properties, use is made of: azo initiators having imidazoline group such as 2,2'-azobis [2-(imidazoline-2-yl) propane] and so on; azo initiators having pyridine group such as 4,4'-azobis [4-cyanovaleric acid (methylpyridine) amide] and so on; and azo initiators having amino group such as 4,4' azobis [4-cyanovaleric acid (methylamine) amide], 4,4'-azobis [4-cyanovaleric (methylcyclohexyl) amide] and so on.

As organic alkyl sulfonates, use is made of: methyl benzenesulfonate; ethyl benzenesulfonate; methyl p-toluenesulfonate; ethyl p-toluenesulfonate; methyl trifluoromethanesulfonate; methyl trifluoromethylbenzenesulfanate and so on.

As to an amount of organic alkyl sulfonate to be used, it is preferred to use 2-10 mol, more preferably 2.1-5 mol with respect to 1 mol of the initiator.

As a solvent used for the initiator synthesizing, use is made of: alcohol such as methanol, ethanol, isopropyl alcohol and so on; halogenated organic solvent such as acetone, acetonitrile, tetrahydrofuran, chloroform and so on, and use is preferably made of methanol and ethanol.

Fine Particles Synthesizing Examples

After 2,2'-azobis [2-(imidazoline-2-yl) propane] trifluoromethylsulfonate was dissolved in water, a mixed liquid of styrene and divinylbenzene was added and a reaction was performed at a temperature of 75° C. for 18 hours. After finishing the reaction, unnecessary solid materials were removed and the particles were retrieved by means of a centrifugal machine. After the thus retrieved particles were washed by methanol, acetone and n-hexane in this order, the retrieved particles were dried at 60° C. by means of an oven to obtain highly cross-linked polystyrene particles. Examples of Fine Particle Raw Materials As to monomer used for the particle synthesizing, use is made of monomer having a single vinyl group or a plurality of vinyl groups such as: styrene; vinylnaphthalene; 4-vinylbiphenyl; divinylbenzene; divinylnaphthalene; divinylbiphenyl and so on. The monomer having a plurality of vinyl groups may be used solely or a combination thereof may be used. The monomers which can be used in the present invention are not limited to the examples mentioned above.

In order to improve a strength of the particles, it is preferred that 1 mol % or more of the monomer having at least two vinyl groups is existent with respect to an overall amount of the monomer, and 10 mol % is more preferable in this case.

As to the particle polymerizing solvent, use may be made of water only, or may be made of a mixed solvent such as water/methanol, water/ethanol, water/propanol, water/ethyl acetate and do on. A mixing rate may be 0-80% preferably 0-40%.

The pH adjuster may be used for controlling the particle diameter.

In the particles for display media according to the invention, the fine particles having positively-charging properties and having a particle diameter of 30-1000 nm, which cannot be achieved by the resin fine particles produced according to the known initiators, can be obtained by polymerizing monomer by means of "the initiator having functional groups indicating positively-charging properties produced by reacting organic alkyl sulfonates and both terminal ends of azo initiator having cationic functional group including nitrogen-containing heterocycle or nitrogen-containing fatty series". The inventors of the present invention devoted themselves to investigate a polymerizing mechanism of soap-free polymerization, and found that it is possible to prevent giant growth and distortion due to agglutination and fusion of the particles with each other, which are generated at polymerization primary stage, by controlling a surface state (such as a surface potential) of the particles. Specifically, a new cationic polymerizing initiator can be obtained by reacting organic alkyl sulfonate and azo initiator having nitrogen-containing heterocycle such as imidazoline, pyridine and so on or nitrogen-containing fatty series such as cyclohexylamine and so on at their both terminal ends. It is possible to obtain the spherical fine particles having positively-charging properties and having a particle diameter of 30-1000 nm by utilizing this new initiator. Moreover, options of the monomers can be extended. Further, the highly cross-linked fine particles can be produced by using the monomer having at least two vinyl groups, and thus high durability can be achieved.

According to the particles for display media of the invention, the highly cross-linked particles having positively-charging properties and having a particle diameter of 30-1000 nm can be obtained by polymerizing monomer by using "the initiator having functional groups indicating positively-charging properties produced by reacting organic alkyl sulfonates and both terminal ends of azo initiator having cationic functional group including nitrogen-containing heterocycle or nitrogen-containing fatty series". Therefore, the particles for display media according to the invention can be preferably used as the fine child particles, which are attached or fixed to a surface of the parent particles of the particles for display media having high display stability.

Explanations of the Particles for Display Media According to the First Aspect of the Invention The particles for display media are constructed as spherical resin fine particles, in which functional groups indicating charging properties or ionic properties is existent on their surfaces, which are obtained by polymerizing monomer by utilizing initiator having functional groups indicating charging properties or ionic properties at its both terminal ends.

The preferred embodiments of the particles for display media according to the invention are as follows.
(1) An equilibrium weight average charge amount Q of the spherical resin fine particles is in a range of the following formula:

$Q>1.0[\mu C/g]$.

(2) A particle diameter is 30-1000 nm.
(3) Use is made of 0.5-80 mol % of the initiator with respect to a monomer amount.
(4) The particle includes 1 mol % or more of monomer having at least two vinyl groups. Preferably, the particle includes 10 mol % or more of monomer having at least two vinyl groups.

The structure of the particles for display media according to the invention mentioned above provides the structure of the child particles for achieving high durability and improved charging properties. Specifically, the particles for display media according to the invention are the spherical resin particles (spherical child particles), in which functional groups indicating charging properties or ionic properties are existent on their surface portions. In the case such that the spherical resin fine particles having functional groups indicating charging properties or ionic properties are to be produced, the spherical resin fine particle having a particle diameter of not greater than 1000 nm can be obtained by performing polymerization such as emulsion polymerization by utilizing initiator having functional groups indicating charging properties or ionic properties at its both terminal ends. Moreover, in the case such that high durability and improved positively-charging properties are to be achieved, the particles for display media according to the invention can be obtained by using 1 mol % or more of monomer having at least two vinyl groups.

Structure of the Initiator

The initiators used for producing the particles for display media according to the invention are the initiators such as peroxide or azo initiator, having anionic functional group including carboxylic acid, sulfonic acid and so on or having cationic functional group including nitrogen-containing heterocycle such as imidazole, pyridine and so on or nitrogen-containing fatty series such as cyclohexylamine, dimethylamine and so on, at their both terminal ends.

Specific Examples of the Initiators

As the initiators having negatively-charging properties, use is made of potassium persulfate, sodium persulfate, ammonium persulfate, 4,4'-azobis (4-cyanovaleric acid), 4,4'-azobis (4-cyanobutylsulfonic acid), 4,4'-azobis (4-cyanobutylbenzenesulfonic acid), 2,2'-azobis [(N-2'-methylpropanol-2-aminooctyl) sulfonic acid], 2,2'-azobis [(N-2'-methylpropanol-2-aminododecyl) sulfonic acid], 4,4'-azobis (4-cyanobutylsulfonic acid) sodium salt, 4,4'-azobis (4-cyanobutylbenzenesulfonic acid) sodium salt, 2,2'-azobis [(N-2'-methylpropanol-2-aminooctyl) sulfonic acid] sodium salt, 2,2'-azobis [(N-2'-methylpropanol-2-aminododecyl) sulfonic acid] sodium salt, 4,4'-azobis (4-cyanobutylsulfonic acid) potassium salt, 4,4'-azobis (4-cyanobutylbenzenesulfonic acid) potassium salt, 2,2'-azobis [(N-2'-methylpropanol-2-aminooctyl) sulfonic acid] potassium salt, 2,2'-azobis [(N-2'-methylpropanol-2-aminododecyl) sulfonic acid] potassium salt and so on.

As the initiators having positively-charging properties, use is made of 2,2'-azobis [2-(2-methylimidazoline-2-yl) propane] trifluoromethylsulfonate, 2,2'-azobis [2-(2-ethylimidazoline-2-yl) propane] trifluoromethylsulfonate, 2,2'-azobis [2-(2-benzilimidazoline-2-yl) propane] trifluoromethylsulfonate, 2,2'-azobis [2-(2-benzilimidazoline-2-yl) propane] hydrochloride, 2,2'-azobis [2-(2-benzilimidazoline-2-yl) propane] hydrosulfate, 2,2'-azobis-(1-imino-1-pyrrolidino-2-methylpropane) hydrochloride, 2,2'-azobis [2-(2-methylimidazoline-2-yl) propane] trifluoromethylbenzenesulfonate, 2,2'-azobis [2-(2-methylimidazoline-2-yl) propane] toluenesulfonate, 2,2'-azobis [2-(2-methylimidazoline-2-yl) propane] benzenesulfonate, 2,2'-azobis [2-(2-ethylimidazoline-2-yl) propane] trifluoromethylbenzenesulfonate, 2,2'-azobis [2-(2-ethylimidazoline-2-yl) propane] toluenesulfonate, 2,2'-azobis [2-(2-ethylimidazoline-2-yl) propane] benzenesulfonate, 2,2'-azobis [2-(2-butylimidazoline-2-yl) propane] trifluoromethylbenzenesulfonate, 2,2'-azobis [2-(2-butylimidazoline-2-yl) propane] toluenesulfonate, 2,2'-azobis [2-(2-butylimidazoline-2-yl) propane] benzenesulfonate, 2,2'-azobis [2-(2-benzilimidazoline-2-yl) propane] trifluoromethylbenzenesulfonate, 2,2'-azobis [2-(2-benzilimidazoline-2-yl) propane] toluenesulfonate, 2,2'-azobis [2-(2-benzilimidazoline-2-yl) propane] benzenesulfonate, and so on.

In order to form the particles having charging properties, it is preferred to use 0.5-80% of the initiator mentioned above with respect to the monomer amount.

Examples of Fine Particle Raw Materials

As to monomer used for the particle synthesizing, use is made of monomer having a single vinyl group or a plurality of vinyl groups such as: styrene; vinylnaphthalene; 4-vinylbiphenyl; divinylbenzene; divinylnaphthalene; divinylbiphenyl and so on. The monomer having a plurality of vinyl groups may be used solely or a combination thereof may be used. The monomers which can be used in the present invention are not limited to the examples mentioned above.

In order to improve a strength of the particles, it is preferred that 1 mol % or more of the monomer having at least two vinyl groups is existent with respect to an overall amount of the monomer, and 10 mol % is more preferable in this case.

As to the particle polymerizing solvent, use may be made of water only, or may be made of a mixed solvent such as water/methanol, water/ethanol, water/propanol, water/ethyl acetate and do on. A mixing rate may be 0-80% preferably 0-40%.

The pH adjuster may be used for controlling the particle diameter. Fine Particles Synthesizing Examples]

After 4,4'-azobis (4-cyanovaleric acid) was dissolved in basic water solution, a mixed liquid of styrene and divinylbenzene was added and a reaction was performed at a temperature of 75° C. for 18 hours. After finishing the reaction, unnecessary solid materials were removed and the particles were retrieved by means of a centrifugal machine. After the thus retrieved particles were washed by methanol, acetone and n-hexane in this order, the retrieved particles were dried at 60° C. by means of an oven to obtain highly cross-linked polystyrene particles.

In the particles for display media according to the invention, the highly cross-linked fine particles having high charging properties and having a particle diameter of 30-1000 nm, which cannot be achieved by the resin fine particles produced according to the known initiators, can be obtained. The inventors of the present invention devoted themselves to investigate a charging mechanism of the child particles used for the composite particle and the surface adhesion composite process, and found that it is important that the functional group indicating easily charging properties is existent on a surface of the fine particles provided on a surface of the composite particles so as to generate charge during the friction. Then, the inventors of the present invention devoted themselves to investigate a producing method of the fine particles having the functional group indicating charging properties on their surface, and found that it is effective to use soap-free polymerization. Accordingly, it is possible to obtain the spherical particles having charging groups on a surface thereof and having a particle diameter of 30-1000 nm by using the initiators having functional groups indicating charging properties or ionic properties at its both terminal ends, and thus a design of the fine particles having positively-charging properties or negatively-charging properties becomes easy. Moreover, options of the monomers can be extended. Further, the highly cross-linked fine particles can be produced by using the monomer having at least two vinyl groups, and thus high durability can be achieved.

According to the particles for display media of the invention, the highly cross-linked particles having positively-charging properties and having a particle diameter of 30-1000 nm can be obtained by polymerizing monomer by using "the initiator having functional groups indicating charging properties or ionic properties at its both terminal ends" according to the invention. Therefore, the particles for display media according to the invention can be preferably used as the fine child particles, which are attached or fixed to a surface of the parent particles of the particles for display media having high display stability.

Hereinafter, respective members constituting the information display panel, which uses display media constituted by the particles for display media according to the first aspect and the second aspect of the invention, will be explained in detail.

As the substrate, at least one of the substrates is the transparent substrate through which a color of the display media can be observed from outside of the information display panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrode arranged according to need in the case of arranging the electrode to the information display panel, use is made of metals such as aluminum, silver, nickel, copper, gold, or, conductive metal oxides such as indium tin oxide (ITO), indium oxide, zinc-toped indium tin oxide (IZO), aluminum-doped zinc oxide (AZO), conductive tin oxide, antimony tin oxide (ATO), conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed. A transparency is necessary for the electrode arranged to the substrate at an observation side (display surface side), but it is not necessary to the substrate at a rear side. In both cases, the materials mentioned above, which are conductive and have a pattern formation capability, can be suitably used. Additionally, the thickness of the electrode may be suitable unless the electroconductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

As the partition wall arranged according to need to the substrate, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-100 μm more preferably 10-50 μm.

Moreover, as a method of forming the partition wall, use may be made of a double rib method wherein ribs are formed on the opposed substrates 1, 2 respectively and they are connected with each other and a single rib method wherein a rib is formed on one of the opposed substrates only. The present invention may be preferably applied to both methods mentioned above.

Figure 6:
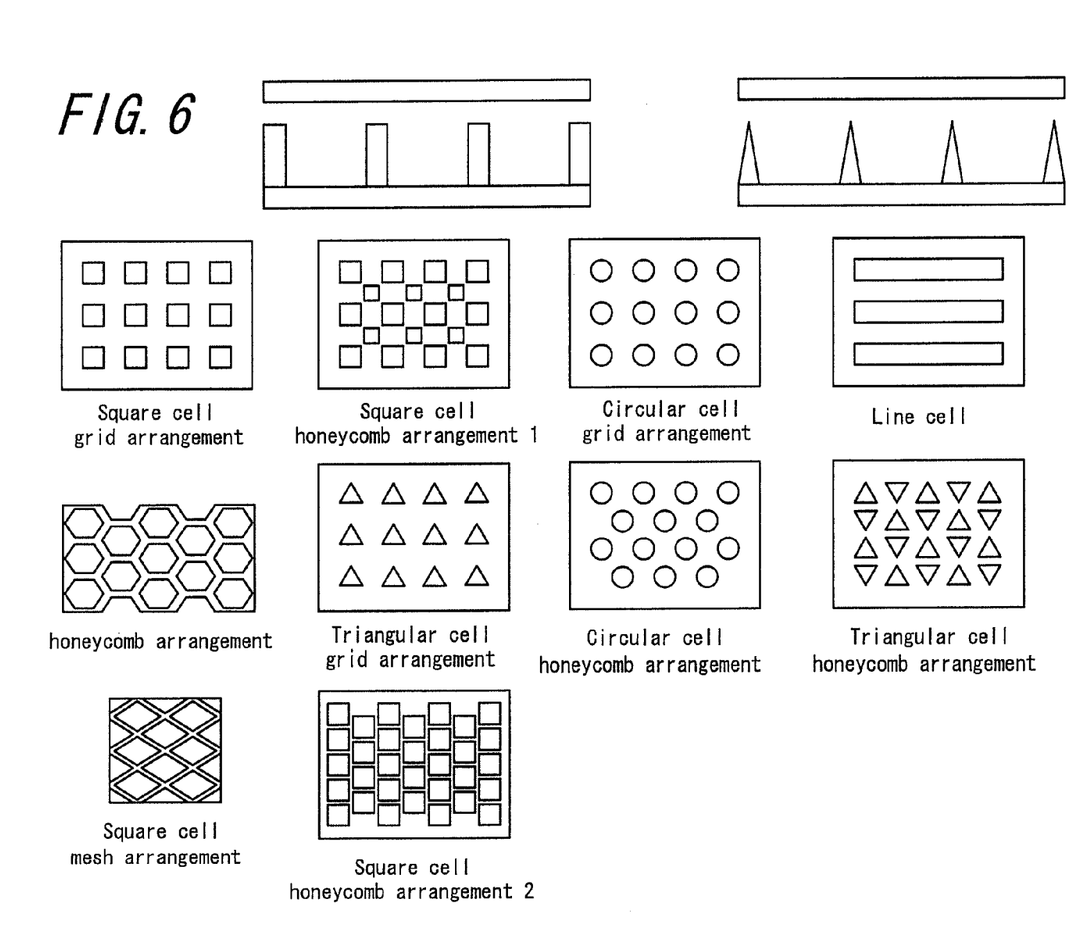
FIG. 6 is a schematic view depicting one embodiment of a shape of partition walls in the information display panel according to the invention.

The cell formed by the partition walls each made of rib has a square shape, a triangular shape, a line shape, a circular shape and a hexagon shape, and has an arrangement such as a grid, a honeycomb and a mesh, as shown in FIG. 6 viewed from a plane surface of the substrate. It is preferred that the portion corresponding to a cross section of the partition wall observed from the display side (an area of the frame portion of the display cell) should be made as small as possible. In this case, a clearness of the image display can be improved.

Here, as the formation method of the partition wall, use may be made of a die transfer method, a screen-printing method, a sandblast method, a photolithography method and an additive method. These methods may be preferably used for the information display panel installed in the information display device. Among them, it is preferred to use a photolithography method using a resist film or a die transfer method.

Then, the particles for display media (hereinafter, sometimes called as particles) constituting the display media used in the information display panel according to the invention will be explained. The particles for display media are used as the display media as they are, or, used as the display media after they are mixed with the other particles.

The particle may be composed of resins as a main ingredient, and can include according to need charge control agents, coloring agent, inorganic additives and so on. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanza yellow G, hanza yellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent. The particles for display media having a desired color can be produced by mixing the coloring agents mentioned above.

Moreover, as the average particle diameter d(0.5) of the particles for the display media (hereinafter, called sometimes as particles), it is preferred to set d(0.5) to 1-50 μm and to use even particles. If the average particle diameter d(0.5) exceeds this range, the image clearness sometimes deteriorated, and, if the average particle diameter is smaller than this range, an agglutination force between the particles becomes larger and the movement of the particles is prevented.

Further, it is preferred that particle diameter distribution Span of the particles, which is defined by the following formula, is less than 5 preferably less than 3:

Span=$(d(0.9)-d(0.1))/d(0.5)$;

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span of the particles is set to not more than 5, the particle diameter becomes even and it is possible to perform an even particle movement.

Furthermore, among the particles for display media, it is preferred to set a ratio of d(0.5) of the particles having smallest diameter with respect to d(0.5) of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Further, in the case that the display media constituted by the particles for display media according to the invention are applied to the information display panel in which the particles are moved in the space, it is important to control a gas in a gap surrounding the display media between the substrates, and a suitable gas control contributes an improvement of display stability. Specifically, it is important to control a humidity of the gas in the gap to not more than 60% RH at 25° C., preferably not more than 50% RH.

The above gap means a gas portion surrounding the display media obtained by substituting the electrodes 5, 6 (in the case that the electrodes are arranged inside of the substrate), an occupied portion of the display media 3, an occupied portion of the partition walls 4 (in the case that the partition walls are arranged) and a seal portion of the information display panel from the space between the substrate 1 and the substrate 2 for example in FIGS. 1a, 1b-FIGS. 4a, 4b and FIGS. 5a-5d.

A kind of the gas in the gap is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the particles for display media and assembling the information display panel under an atmosphere having a predetermined humidity and to apply a seal member and a seal method for preventing a humidity inclusion from outside of the device.

In the information display panel which is an object of the invention, an interval between the substrates is not restricted if the particles for display media can be moved and a contrast can be maintained, and it is adjusted normally to 10-500 μm, preferably 10-200 μm.

Moreover, it is preferred to control a volume occupied rate of the particles for display media in a space between the opposed substrates to 5-70%, more preferably 5-60%. If the volume occupied rate of the particles or the liquid powders exceeds 70%, the particles for display media become difficult to move, and if it is less than 5%, a sufficient contrast cannot be obtained.

Embodiments

Hereinafter, the present invention will be explained specifically in detail with reference to the examples relating to the first aspect and the second aspect of the invention and the comparative examples, but the present invention is not limited to the following examples.

EXAMPLES RELATING TO THE FIRST ASPECT OF THE INVENTION

[Measurement Condition]

A particle diameter was obtained by measuring a diameter by means of a photograph taken by transmission electron microscope (S3000: product of JEOL Ltd.)

A charging amount of the particles were measured on the basis of commonly used blow-off method.

Measurement device: charging amount measurement device of blow-off type (TG-203, product of KYOCERA Chemical Corporation)
Mesh aperture: 32 [μm]
Blow pressure/Suction pressure: 4.5 [kPa]/9.5 [kPa]
Carrier: F96-80 (product of Powdertech)
Shaking number: 1000 (initial stage), 4000 (long term)

Synthesizing of Cationic Initiator

After 2.80 g of VA-061 produced by Wako Pure Chemical Industries Ltd. (2,2'-azobis [2-(imidazoline-2-yl) propane] was dissolved in 289 ml of methanol, 4.52 g of methyl trifluoromethylsulfonate was dropped at room temperature for one hour. After finishing the drop process, an agitation was performed at room temperature for 18 hours, solvent was removed by means of evaporator, and washing was performed two times by means of chloroform. After the washing process, drying was performed under reduced pressure, and solvent was removed. Then, 6.03 g of a white body: 2,2'-azobis [2-(2-methylimidazoline-2-yl) propane] trifluoromethylsulfonate (hereinafter, referred to VA-061-Me) was obtained. The yield rate was 84.5%.

Hereinafter, the analyzing result for recognizing the structure of this compound is shown.

1H-NMR δ (CDCl3): 1.38 [12H, s, —CCH3], 2.95 [0.9H, s, —NCH3], 3.90 [8H.s.-CCH2N—]

Example 1

Particle Production

After 0.09 g of VA-061-Me was dissolved in 39 g of water, a mixed liquid of 0.25 g of styrene (Nakarai Tesk) and 0.25 g of divinylbenzene was added softly, the vessel was closed and then a reaction was performed at a temperature of 75° C. for 18 hours with a rotation number of 300 rpm. After finishing the reaction, unnecessary solid materials were removed and the particles were retrieved by means of a centrifugal machine. After 200 ml of methanol was added to the thus retrieved particles which are then scattered therein, the particles were retrieved by means of a centrifugal machine. After this retrieving operation was performed by using acetone at one time and by using n-hexane at two times to wash the particles, the retrieved particles were dried at 60° C. by means of an oven to obtain cross-linked polystyrene particles. A diameter of the particles was 213 nm. An initial friction charge was 150 [μC/g] and a long term friction charge was 300 [μC/g]. The particles showed positively-charging properties.

Example 2

Particle Production

The production was performed in the same manner as that of the example 1 except that use is made of 0.14 g of VA-061-Me to obtain the cross-linked polystyrene particles. A diameter of the particles was 177 nm. An initial friction charge was 150 [μC/g] and a long term friction charge was 300 [μC/g]. The particles showed positively-charging properties.

Example 3

Particle Production

The production was performed in the same manner as that of the example 1 except that use is made of 0.23 g of VA-061-Me to obtain the cross-linked polystyrene particles. A diameter of the particles was 281 nm. An initial friction charge was 952 [μC/g] and a long term friction charge was 672 [μC/g]. The particles showed positively-charging properties.

Example 4

Particle Production

The production was performed in the same manner as that of the example 1 except that use is made of 0.76 g of VA-061-Me, 260 g of water, 1.01 g of styrene (Nakarai Tesk) and 1.01 g of divinylbenzene to obtain the cross-linked polystyrene particles. A diameter of the particles was 160 nm. An initial friction charge was 54 [μC/g] and a long term friction charge was 165 [μC/g]. The particles showed positively-charging properties.

Comparative Example 1

The production was performed in the same manner as that of the example 1 except that use is made of 0.25 g of V50 (2,2'-azobis (2-methylpropionamidine) dihydrochloride) as the initiator. Only agglutination bodies were obtained, and the spherical particles were not obtained.

Comparative Example 2

Use is made of 0.25 g of V50 (2,2'-azobis (2-methylpropionamidine) dihydrochloride) as the initiator, and 39 g of water and further 0.04 g of concentrated hydrochloric acid were added therein. A mixed liquid of 0.25 g of styrene (Nakarai Tesk) and 0.25 g of divinylbenzene was added softly, the vessel was closed and then a reaction was performed at a temperature of 75° C. for 18 hours with a rotation number of 300 rpm. After finishing the reaction, unnecessary solid materials were removed and the particles were retrieved by means of a centrifugal machine. After 200 ml of methanol was added to the thus retrieved particles which are then scattered therein, the particles were retrieved by means of a centrifugal machine. After this retrieving operation was performed by using acetone at one time and by using n-hexane at two times to wash the particles, the retrieved particles were dried at 60° C. by means of an oven. Only agglutination bodies were obtained, and the spherical particles were not obtained.

Comparative Example 3

The production was performed in the same manner as that of the comparative example 2 except that use is made of 0.3 g of VA044 (2,2'-azobis [2-(imidazoline-2-yl) propane] dihydrochloride) as the initiator. Only agglutination bodies were obtained, and the spherical particles were not obtained.

Comparative Example 4

The production was performed in the same manner as those of the examples 1-3 except that use is made of 0.3 g of VA044 (2,2'-azobis [2-(imidazoline-2-yl) propane] dihydrochloride) as the initiator. Only agglutination bodies were obtained, and the spherical particles were not obtained.

Comparative Example 5

The production was performed in the same manner as those of the examples 1-3 except that use is made of 0.1 g of VA044 (2,2'-azobis [2-(imidazoline-2-yl) propane] dihydrochloride) as the initiator. Only agglutination bodies were obtained, and the spherical particles were not obtained.

The production data of the particles relating to the examples 1-4 are shown in the following Table 1, and the production data of the particles relating to the comparative examples 1-5 are shown in the following Table 2. Symbol ○ indicates that the spherical particles are obtained, and symbol X indicates that the spherical particles are not obtained. In addition, the following texts shown in Tables 1 and 2 correspond to the following materials.

VA-061-Me: 2,2'-azobis [2-(2-methylimidazoline-2-yl) propane] trifluoromethylsulfonate]
V50: 2,2'-azobis (2-methylpropionamidine) dihydrochloride
VA044: 2,2'-azobis [2-(imidazoline-2-yl) propane] dihydrochloride
St: styrene
DVB: divinylbenzene

TABLE 2

| Comparative Example No. | Initiator Type | Amount [g] | St [g] | DVB [g] | Concentrated hydrochloric acid [g] | Water [g] | Particle |
|---|---|---|---|---|---|---|---|
| 1 | V50 | 0.25 | 0.25 | 0.25 | 0 | 39 | X |
| 2 | V50 | 0.25 | 0.25 | 0.25 | 0.04 | 39 | X |
| 3 | VA044 | 0.3 | 0.25 | 0.25 | 0.04 | 39 | X |
| 4 | VA044 | 0.3 | 0.25 | 0.25 | 0 | 39 | X |
| 5 | VA044 | 0.12 | 0.25 | 0.25 | 0 | 38 | X |

From the results of the examples 1-4, it was found that the cross-linked particles having a particle diameter of 30-1000 nm can be obtained by polymerizing monomer by using "the initiator having functional groups indicating positively-charging properties produced by reacting organic alkyl sulfonates and both terminal ends of azo initiator having cationic functional group including nitrogen-containing heterocycle or nitrogen-containing fatty series" and the particles shows positively-charging properties due to a friction charging.

EXAMPLES RELATING TO THE SECOND ASPECT OF THE INVENTION

[Measurement Condition]
A particle diameter was obtained by measuring a diameter by means of a photograph taken by transmission electron microscope (S3000: product of JEOL Ltd.)
A charging amount of the particles were measured on the basis of commonly used blow-off method.
Measurement device: charging amount measurement device of blow-off type (TG-203, product of KYOCERA Chemical Corporation)
Mesh aperture: 32 [μm]
Blow pressure/Suction pressure: 4.5 [kPa]/9.5 [kPa]
Carrier: F96-80 (product of Powdertech)
Shaking number: 1000 (initial stage), 4000 (long term)

Example 11

Production of Negatively-Charged Particles

Into the conical flask, 2.4 g of V-501 produced by Wako Pure Chemical Ltd. (4,4'-azobis (4-cyanovaleric acid) was added, and 14.4 g of 1 mol/L odium hydroxide and 780 g of purified water were added in this order so as to dissolve V-501. After 15 g of mixed liquid of styrene and divinylbenzene (produced by Tokyo Chemical Industry Co., Ltd.), which are contained in a weight ratio of 1:1, was added, the bubbling was performed at room temperature for 20 minutes

TABLE 1

| | | | | | SEM measurement | | | | | |
|---|---|---|---|---|---|---|---|---|---|---|
| | Initiator | | | | Concentrated | | | Particle | Initial friction charging | Long term friction charging |
| Example No. | Type | Amount [g] | St [g] | DVB [g] | hydrochloric acid [g] | Water [g] | Particle | diameter [nm] | amount [μC/g] | amount [μC/g] |
| 1 | V-061-Me | 0.09 | 0.25 | 0.25 | 0 | 39 | ○ | 213 | 185 | 350 |
| 2 | V-061-Me | 0.14 | 0.25 | 0.25 | 0 | 39 | ○ | 177 | 150 | 300 |
| 3 | V-061-Me | 0.23 | 0.25 | 0.25 | 0 | 39 | ○ | 281 | 952 | 672 |
| 4 | V-061-Me | 0.76 | 1.01 | 1.01 | 0 | 39 | ○ | 160 | 54 | 165 | by using nitrogen gas. After the flask was closed and sealed so as not to leak monomer from the flask, the polymerization was performed at a temperature of 75° C. for 24 hours so as to obtain white polymerized solution. After filtering the polymerized solution, washing was performed by using methanol, acetone and n-hexane in this order. The polymerized substances were retrieved by means of a centrifugal machine, and the retrieved polymerized substances were dried at 60° C. for 24 hours, thereby obtaining cross-linked polystyrene fine particles having carboxyl group at its surface. The particle diameter of the fine particles was 190 nm. The charging amount after 1000 times shaking was −22 µC/g and the charging amount after 4000 times shaking was −79 µC/g.

Example 12

Production of Negatively-Charged Particles

The negatively-charged particles were produced in the same manner as that of the example 11 except that use is made of 2.1 g of V-501 produced by Wako Pure Chemical Ltd. (4,4'-azobis (4-cyanovaleric acid), 12.6 g of 1 mol/L odium hydroxide and 8.0 g of mixed liquid of styrene and divinylbenzene (produced by Tokyo Chemical Industry Co., Ltd.), which are contained in a weight ratio of 4:1. The 6.3 g of cross-linked polystyrene fine particles having carboxyl group was obtained. The particle diameter of the fine particles was 220 nm. The charging amount after 1000 times shaking was −39 µC/g and the charging amount after 4000 times shaking was −60 µC/g.

Example 13

Production of Negatively-Charged Particles

The negatively-charged particles were produced in the same manner as that of the example 11 except that use is made of 3.6 g of V-501 produced by Wako Pure Chemical Ltd. (4,4'-azobis (4-cyanovaleric acid), 21.6 g of 1 mol/L odium hydroxide and 9.0 g of mixed liquid of styrene and divinylbenzene (produced by Tokyo Chemical Industry Co., Ltd.), which are contained in a weight ratio of 1:1. The cross-linked polystyrene fine particles having carboxyl group were obtained. The particle diameter of the fine particles was 220 nm. The charging amount after 1000 times shaking was −54 µC/g and the charging amount after 4000 times shaking was −143 µC/g.

Example 14

Production of Negatively-Charged Particles

The negatively-charged particles were produced in the same manner as that of the example 11 except that use is made of 5.0 g of V-501 produced by Wako Pure Chemical Ltd. (4,4'-azobis (4-cyanovaleric acid), 30.0 g of 1 mol/L odium hydroxide and 9.0 g of mixed liquid of styrene and divinylbenzene (produced by Tokyo Chemical Industry Co., Ltd.), which are contained in a weight ratio of 1:1. The cross-linked polystyrene fine particles having carboxyl group were obtained. The particle diameter of the fine particles was 210 nm. The charging amount after 1000 times shaking was −59 µC/g and the charging amount after 4000 times shaking was −164 µC/g.

Example 15

Production of Negatively-Charged Particles

The negatively-charged particles were produced in the same manner as that of the example 11 except that use is made of 1.3 g of KPS produced by Wako Pure Chemical Ltd. (potassium persulfate), 10.1 g of 1 mol/L odium hydroxide and 8.0 g of mixed liquid of styrene and divinylbenzene (produced by Tokyo Chemical Industry Co., Ltd.), which are contained in a weight ratio of 1:1. The cross-linked polystyrene fine particles having sulfonate group were obtained. The particle diameter of the fine particles was 210 nm. The charging amount after 1000 times shaking was −40 µC/g and the charging amount after 4000 times shaking was −76 µC/g.

Example 16

Production of Negatively-Charged Particles

The negatively-charged particles were produced in the same manner as that of the example 11 except that use is made of 1.8 g of KPS produced by Wako Pure Chemical Ltd. (potassium persulfate), 14.0 g of 1 mol/L odium hydroxide and 8.0 g of mixed liquid of styrene and divinylbenzene (produced by Tokyo Chemical Industry Co., Ltd.), which are contained in a weight ratio of 1:1. The cross-linked polystyrene fine particles having sulfonate group were obtained. The particle diameter of the fine particles was 210 nm. The charging amount after 1000 times shaking was −71 µC/g and the charging amount after 4000 times shaking was −120 µC/g.

Example 17

Production of Negatively-Charged Particles

The negatively-charged particles were produced in the same manner as that of the example 11 except that use is made of 2.3 g of KPS produced by Wako Pure Chemical Ltd. (potassium persulfate), 17.9 g of 1 mol/L odium hydroxide and 7.0 g of mixed liquid of styrene and divinylbenzene (produced by Tokyo Chemical Industry Co., Ltd.), which are contained in a weight ratio of 1:1. The cross-linked polystyrene fine particles having sulfonate group were obtained. The particle diameter of the fine particles was 210 nm. The charging amount after 1000 times shaking was −71 µC/g and the charging amount after 4000 times shaking was −120 µC/g.

Example 18

Production of Positively-Charged Particles (1) Synthesizing of Cationic Initiators After 2.80 g of VA-061 produced by Wako Pure Chemical Ltd. (2,2'-azobis [2-(imidazoline-2-yl) propane] was dissolved in 289 ml of methanol, 4.52 g of methyl trifluoromethylsulfonate was dropped at room temperature for one hour. After finishing the drop process, an agitation was performed at room temperature for 18 hours, solvent was removed by means of evaporator, and washing was performed two times by means of chloroform. After the washing process, drying was performed under reduced pressure, and solvent was removed. Then, 6.03 g of a white body: mixture (hereinafter, referred to VA-061-Me) of 2,2'-azobis [2-(trifluorosulfonate-2-methylimidazoline-2-yl) propane], 2,2'-azo [2-(trifluoro-sulfonate-2-methylimidazoline-2-yl) propane-2-(imidazoline-2-yl) propane], and 2,2'-azobis [2-(imidazoline-2-yl) propane]. The yield rate was 84.5%.

Hereinafter, the analyzing result for recognizing the structure of this compound is shown.

1H-NMR S(CDCl3): 1.38 [12H, s, —CCH3], 2.95 [0.9H, s, —NCH3], 3.90 [8H.s.-CCH2N—]

(2). Production of Positively-Charged Particles

After 4.6 g of VA-061-Me was dissolved in 780 g of water, a mixed liquid of 5.0 g of styrene (Nakarai Tesk) and 5.0 g of divinylbenzene was added softly, the vessel was closed and then a reaction was performed at a temperature of 75° C. for 18 hours with a rotation number of 300 rpm. After finishing the reaction, unnecessary solid materials were removed and the particles were retrieved by means of a centrifugal machine. After 200 ml of methanol was added to the thus retrieved particles which are then scattered therein, the particles were retrieved by means of a centrifugal machine. After this retrieving operation was performed by using acetone at one time and by using n-hexane at two times to wash the particles, the retrieved particles were dried at 60° C. by means of an oven to obtain cross-linked polystyrene particles. A diameter of the particles was 280 nm. An initial friction charge was 952 [μC/g] and a long term friction charge was 672 [μC/g]. The particles showed positively-charging properties.

The production data of the negatively-charged particles relating to the examples 11-17 and the positively-charged particles relating to the example 18 are shown in the following Table 3. In addition, the following texts shown in Tables 3 correspond to the following materials.

V-501: 4,4'-azobis (4-cyanovaleric acid)
KPS: potassium persulfate
VA-061-Me: mixture of 2,2'-azobis [2-(trifluorosulfonate-2-methylimidazoline-2-yl) propane], 2,2'-azo [2-(trifluorosulfonate-2-methylimidazoline-2-yl) propane-2-(imidazoline-2-yl) propane], and 2,2'-azobis [2-(imidazoline-2-yl) propane]
St: styrene
DVB: divinylbenzene 16 were summarized in Table 4. Every result showed a low charging amount as compared with the example 11-example 18. In addition, the following texts shown in Tables 4 correspond to the following materials.

NPS-6MF (SOC): nanoporous silica
KE-P10: amorphous silica
KE-P10 (sintered): amorphous silica KE-P10 was sintered at 1200° C. under vacuum condition for one hour
KE-P10 (TN-6): amorphous silica
SX8742C-04: polystyrene particles
SX8743C-05: polystyrene particles

TABLE 4

| Comparative example No. | Particle | Particle diameter [nm] | Initial friction charging amount [μC/g] | Long term friction charging amount [μC/g] |
|---|---|---|---|---|
| 11 | NPS-6MF(SOC)) | 75 | −34 | −28.7 |
| 12 | KE-P10 | 110 | −38.7 | |
| 13 | KE-P10(sinterd) | 110 | −32.7 | −8.3 |
| 14 | KE-P10(TN6) | 110 | 4.2 | |
| 15 | SX8742C-04 | 300 | −16.6 | 6.9 |
| 16 | SX8743-05 | 500 | −9.9 | −13.4 |

From the results of the examples 11-18, it was found that the cross-linked particles having a particle diameter of 30-1000 nm can be obtained by polymerizing monomer by using "the initiator having functional groups indicating charging properties or ionic properties at its both terminal ends" and the larger charging amount relating to the friction charging especially long term friction charging amount can be obtained as compared with the comparative example 11-comparative example 16 using the commercially available inorganic particles and polystyrene particles.

INDUSTRIAL APPLICABILITY

The information display panel using the display media constituted by the particles for display media according to the

TABLE 3

| | Initiator | | | | | | | Initial friction | Long term friction charging |
|---|---|---|---|---|---|---|---|---|---|
| Example No. | Type | Amount [g] | St [g] | DVB [g] | 1N NaOH | Water [g] | Methanol | Particle diameter [nm] | charging amount [μC/g] | amount [μC/g] |
| 11 | V-501 | 2.4 | 7.5 | 7.5 | 14.4 | 780 | 0 | 190 | −22 | −79 |
| 12 | V-501 | 2.1 | 6.4 | 1.6 | 12.6 | 540 | 220 | 220 | −39 | −60 |
| 13 | V-501 | 3.6 | 4.5 | 4.5 | 21.6 | 780 | 0 | 220 | −54 | −143 |
| 14 | V-501 | 5.0 | 4.5 | 4.5 | 30.0 | 780 | 0 | 210 | −59 | −164 |
| 15 | KPS | 1.3 | 4.0 | 4.0 | 10.1 | 780 | 0 | 210 | −40 | −76 |
| 16 | KPS | 1.8 | 4.0 | 4.0 | 14.0 | 780 | 0 | 210 | −71 | −162 |
| 17 | KPS | 2.3 | 3.5 | 3.5 | 17.9 | 780 | 0 | 210 | −71 | −120 |
| 18 | VA-061-Me | 4.5 | 5.0 | 5.0 | 0.0 | 780 | 0 | 280 | 953 | 672 |

Comparative Examples

As the comparative examples, use was made of commercially available inorganic fine particles (comparative example 11-comparative example 14) and commercially available polystyrene fine particles (comparative example 15 and comparative example 16). With respect to the comparative example 11-comparative example 16, the charging amount after 1000 times shaking and the charging amount after 4000 times shaking were measured. The particle diameter and the charging amount of the commercially available fine particles relating to the comparative example 11-comparative example invention, which is manufactured according to the invention, is preferably applicable to the display unit for mobile equipment such as notebook personal computers, electric diary, PDAs (Personal Digital Assistants), cellular phones, handy terminals and so on; to the electric paper such as electric books, electric newspapers, electric manual (instruction) and so on; to the bulletin boards such as signboards, posters, blackboards, whiteboards and so on; to the image display unit for electric calculator, home electric application products, auto supplies and so on; to the card display unit such as point cards, IC cards and so on; and to the display unit for electric advertisements, information boards, electric POPs (Point Of Presence, Point Of Purchase advertising), electric price tags, electric shelf tags, electric musical score, RF-ID device and so on. In addition, the information display panel is preferably applicable to the display unit for electric equipments such as POS terminals, car navigation system, clock and so on. Further, the information display panel is preferably applicable to rewritable paper (which can be re-written by using outer field generating device).

As to the driving method of the information display panel according to the invention, use may be made of various types of driving methods such as: the simple matrix driving method and the static driving method, in which no switching element is used in the panel; the active matrix driving method using the three-terminal switching element such as thin film transistor (TFT) or the two-terminal switching element such as thin film diode (TFD); and the outer field driving method using outer field.

The invention claimed is

1. Particles for display media characterized in that the particles are constructed as spherical resin fine particles, in which functional groups indicating positively-charging properties are existent on their surfaces, which are obtained by polymerizing monomer by utilizing initiator having functional groups indicating positively-charging properties produced by reacting organic alkyl sulfonates and both terminal ends of azo initiator having cationic functional group including nitrogen-containing heterocycle or nitrogen-containing fatty series.

2. The particles for display media according to claim 1, wherein an equilibrium weight average charge amount Q of the spherical resin fine particles is in a range of the following formula:

$Q > 1.0 [\mu C/g]$.

3. The particles for display media according to claim 1, wherein a particle diameter is 30-1000 nm.

4. The particles for display media according to claim 1, wherein use is made of 0.5-80 mol % of the initiator with respect to a monomer amount.

5. The particles for display media according to claim 1, wherein the particle includes 1 mol % or more of monomer having at least two vinyl groups.

6. The particles for display media according to claim 1, wherein the particles are used for surface adhesion composed process.

7. An information display panel characterized in that use is made of the particles for display media set forth in claim 1 as particles constituting the display media of an information display panel, in which at least one group of display media having optical reflectance and charge properties and constituted by at least one group of particles are sealed in a space between two substrates, at least one substrate being transparent, and, in which the display media, to which an electrostatic field is applied, are made to move so as to display information such as an image.

8. Particles for display media characterized in that the particles are constructed as spherical resin fine particles, in which functional group indicating charging properties or ionic properties is existent on their surfaces, which are obtained by polymerizing monomer by utilizing initiator having functional groups indicating charging properties or ionic properties at its both terminal ends.

9. The particles for display media according to claim 8, wherein an equilibrium weight average charge amount Q of the spherical resin fine particles is in a range of the following formula:

$Q > 1.0 [\mu C/g]$.

10. The particles for display media according to claim 8, wherein a particle diameter is 30-1000 nm.

11. The particles for display media according to claim 8, wherein use is made of 0.5-80 mol % of the initiator with respect to a monomer amount.

12. The particles for display media according to claim 8, wherein the particle includes 1 mol % or more of monomer having at least two vinyl groups.

13. The particles for display media according to claim 8, wherein the particles are used for surface adhesion composed process.

14. An information display panel characterized in that use is made of the particles for display media set forth in claim 8 as particles constituting the display media of an information display panel, in which at least one group of display media having optical reflectance and charge properties and constituted by at least one group of particles are sealed in a space between two substrates, at least one substrate being transparent, and, in which the display media, to which an electrostatic field is applied, are made to move so as to display information such as an image.

* * * * *